Sept. 30, 1930.  L. K. CHESWRIGHT  1,776,850
HOSE CLAMP
Filed April 22, 1929
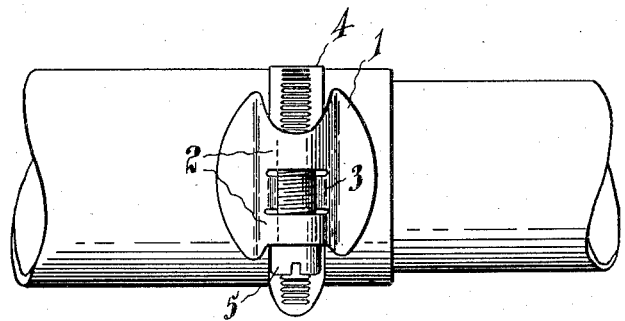
Fig.1.
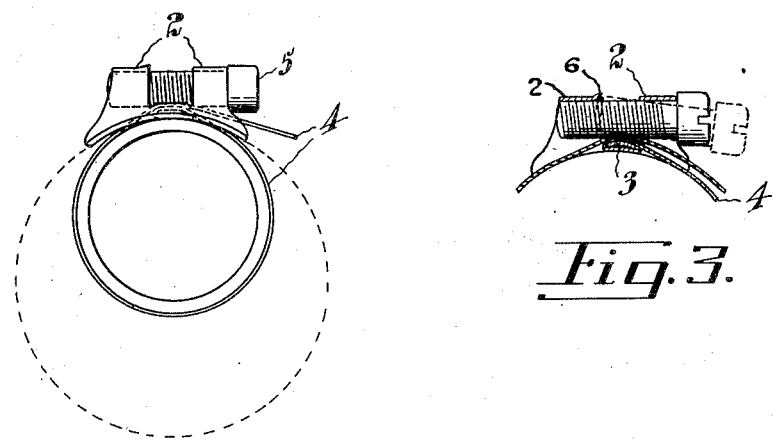
Fig.2.
Fig.3.
Inventor
L.K.Cheswright
by J. Edw. Maybee
ATTY

UNITED STATES PATENT OFFICE

LEONARD K. CHESWRIGHT, OF SWANSEA, ONTARIO, CANADA, ASSIGNOR OF ONE-HALF TO ROBERT N. MORRISON, OF TORONTO, ONTARIO, CANADA

HOSE CLAMP

Application filed April 22, 1929. Serial No. 357,054.

This invention relates to clamps as used for clamping the ends of hose to couplings or other fittings. With the clamps now in use there is a tendency to cause deformation of the clamp, which permits a bulging of the hose at the part of its circumference where the ends of the clamp are connected. The object of my invention is to devise a clamp which may be used for various diameters of hose and which will tightly hold the hose at all parts of its circumference, no matter how tightly the clamp may be applied.

I attain my objects by means of the constructions hereinafter described and illustrated in the accompanying drawings, in which Fig. 1 is a side elevation of a piece of hose with my clamp in position thereon;

Fig. 2 an end elevation of the same;

Fig. 3 a sectional detail of the same.

In the drawings like numerals of reference indicate corresponding parts in the different figures.

The clamp comprises a band and a connector for connecting the ends of the band.

The connector may be formed in various ways. In the drawings it is shown as formed from a flat piece of metal 1, being slit in two places and stamped up to form two outer bridge members 2, and an inner intermediate bridge member 3, forming between them a passageway. On the inner or intermediate bridge member 3 is hooked one end of the band 4, the other end of the band being slipped over the hooked end but beneath the outer bridge members 2.

The band is formed with a thread thereon adapted to be engaged with the threads of a tightening screw 5, which is slipped beneath the bridge members 2, with its head engaging the side of one of the members 2. The inner surfaces of the bridges are not threaded, which facilitates the slipping in aforesaid. In Fig. 3 the screw is shown in dotted lines in partially inserted position. Up to this point the screw does not engage in the threads in the band. Further advance of the screw, through the engagement of its end with the inclined surface 6 forces it into engagement with the thread on the band, and rotation of the screw will cause it to move longitudinally of the passage until the head of the screw engages the adjacent bridge member 2. By further rotating the screw 5, the band may be drawn up to tighten it about the hose to the desired extent.

It will be noted that the hose engaging face of the connection is arc-shaped, and this is utilized to hold the hose at that part where the band is not in close engagement with the hose through its overlapping of the hooked end.

The variations in the arc due to the different diameters of hose on which the clamp may be used, will not make any material difference owing to the short part of the circumference of the hose it is necessary to hold by means of the connector itself. This is illustrated in Fig. 2 which shows a hose of small diameter in full lines and a hose of larger diameter in dotted lines.

From the above description it will be seen that I have devised a clamp which will satisfactorily attain the object of my invention.

As the screw 5 is slidable in said passageway, and will be slipped into position subsequent to the insertion of the free end of the band, thus enabling a quicker taking up to be obtained than would be possible if the screw had to be rotated to take up the full length of the band.

What I claim as my invention is:

1. In a hose clamp, the combination of a connector having a passageway therethrough transversely of the hose; a band having one end connected with the connector and its other end slidable through said passageway; and a tightening screw slidable and rotatable in said passageway, and having a threaded engagement with the band.

2. In a hose clamp, the combination of a connector having outer and inner bridge members forming between them a passageway extending transversely of the hose; a band having one end connected with the connector and its other end slidable through said passageway; and a tightening screw slidable and rotatable in said passageway, and having a threaded engagement with the band.

3. In a hose clamp, the combination of a connector having a pair of spaced outer bridge members and an inner bridge member intermediate the outer bridge members forming a passageway through said connector extending transversely of the hose; a band having one end connected with the inner bridge member, and its other end slidable through said passageway; and a tightening screw slidable and rotatable in said passageway, and having a threaded engagement with the band.

4. In a hose clamp, the combination of a connector having a pair of spaced outer bridge members and an inner bridge member intermediate the outer bridge members forming a passageway through said connector extending transversely of the hose; a band having one end detachably connected with the inner bridge member, and its other end slidable through said passageway; and a tightening screw slidable and rotatable in said passageway, and having a threaded engagement with the band.

5. In a hose clamp, the combination of a connector having a passageway therethrough transversely of the hose, the hose engaging face of said connector being arc-shaped circumferentially of the hose; a band having one end connected with the connector and its other end slidable through said passageway; and a tightening screw slidable and rotatable in said passageway, and having a threaded engagement with the band.

6. In a hose clamp, the combination of a connector having a pair of spaced outer bridge members and an inner bridge member intermediate the outer bridge members forming a passageway through said connector, the hose engaging face of said connector being arc-shaped circumferentially of the hose; a band having one end connected with the inner bridge member, and its other end slidable through said passageway; and a tightening screw in said passageway extending longitudinally of the band, and having a threaded engagement therewith.

7. In a hose clamp, the combination of a connector having a passageway therethrough transversely of the hose; a band having one end connected with the connector intermediate the ends thereof, and its other end slidable through said passageway; and a tightening screw slidable and rotatable in said passageway, and having a threaded engagement with the band.

8. In a hose clamp, the combination of a connector having a passageway therethrough transversely of the hose, the hose engaging face of said connector being arc-shaped circumferentially of the hose; a band having one end connected with the connector intermediate the ends thereof, and its other end slidable through said passageway; and a tightening screw slidable and rotatable in said passageway, and having a threaded engagement with the band.

9. In a hose clamp, the combination of a connector formed from an integral piece of metal and having a passageway therethrough; a band having one end connected with the connector intermediate the ends thereof, and its other end slidable through said passageway; and a tightening screw slidable and rotatable in said passageway, and having a threaded engagement with the band.

10. In a hose clamp, the combination of a connector formed from an integral piece of metal and having a pair of spaced outer bridge members and an inner bridge member intermediate the outer bridge members forming a passageway through said connector; a band having one end connected with the inner bridge member, and its other end slidable through said passageway; and a tightening screw in said passageway extending longitudinally of the band, and having a threaded engagement therewith.

11. In a hose clamp, the combination of a connector having a passageway therethrough transversely of the hose; a band having one end connected with the connector and its other end adapted to slide through said passageway; and a tightening screw having a sliding and rotatable movement in said passageway, and having a threaded engagement with the band, said screw being adapted to be inserted in the passageway after the insertion of the free end of the band.

12. In a hose clamp, the combination of a connector having a pair of spaced outer bridge members and an inner bridge member intermediate the outer bridge members forming a passageway through said connector; a band having one end connected with the inner bridge member, and its other end slidable through said passageway; and a tightening screw insertible longitudinally in said passageway after the insertion of the band, and having a threaded engagement therewith.

13. In a hose clamp, the combination of a connector channel-shaped in cross section; a bar extending across said channel adjacent its open side; the hose engaging face of said connector being arc-shaped circumferentially of the hose; a band having one end connected with said bar and its other end slidable between the bar and the bottom of the channel; and a tightening screw in said channel extending longitudinally of the band and having a threaded engagement therewith.

14. In a hose clamp, the combination of a connector channel-shaped in cross section; a bar extending across said channel adjacent its open side; the hose engaging face of said connector being arc-shaped circumferentially of the hose; a band having one end connected with said bar and its other end slidable between the bar and the bottom of the channel; and a tightening screw in said channel extending longitudinally of the band and having a threaded engagement therewith, said channel being shaped to permit the screw to be partly inserted longitudinally into said channel and then to rock it into engagement with the band.

15. In a hose clamp, the combination of a connector having a passageway therethrough transversely of the hose; a band having one end connected with the connector and its other end slidable through said passageway; and a tightening screw slidable and rotatable in said passageway, and having a threaded engagement with the band, said passageway being shaped to permit the screw to be partly inserted longitudinally into said passageway and then to rock it into engagement with the band.

16. In a hose clamp, the combination of a connector having a passageway therethrough transversely of the hose; a band having one end connected with the connector and its other end adapted to slide through said passageway; and a tightening screw having a sliding and rotatable movement in said passageway, and having a threaded engagement with the band, said screw being adapted to be inserted in the passageway after the insertion of the free end of the band, said passageway being shaped to permit the screw to be partly inserted longitudinally into said passageway and then to rock it into engagement with the band.

Signed at Toronto, Can., this 19th day of April, 1929.

LEONARD K. CHESWRIGHT.